United States Patent
Feikas et al.

(10) Patent No.: US 8,897,514 B2
(45) Date of Patent: Nov. 25, 2014

(54) IMAGING METHOD FOR MOTION ANALYSIS

(75) Inventors: Thomas Feikas, Vaterstetten (DE); Matthias Brundobler, Munich (DE); Stephen J. Ferguson, Ruppoldsried (CH); Paul Thistlethwaite, Bern (CH)

(73) Assignees: Brainlab AG, Feldkirchen (DE); AO Technology AG, Chur (DE)

( * ) Notice: Subject to any disclaimer, the term of this patent is extended or adjusted under 35 U.S.C. 154(b) by 1483 days.

(21) Appl. No.: 12/175,226

(22) Filed: Jul. 17, 2008

(65) Prior Publication Data

US 2009/0022382 A1    Jan. 22, 2009

Related U.S. Application Data

(60) Provisional application No. 60/952,885, filed on Jul. 31, 2007.

(30) Foreign Application Priority Data

Jul. 17, 2007    (EP) .................................... 07112645

(51) Int. Cl.
*G06K 9/00* (2006.01)
*G06T 7/00* (2006.01)
*G06T 7/20* (2006.01)

(52) U.S. Cl.
CPC ............... *G06T 7/20* (2013.01); *G06T 7/0044* (2013.01); *G06T 2207/10081* (2013.01); *G06T 2207/30004* (2013.01)
USPC ........................................................ 382/128

(58) Field of Classification Search
CPC ........................................... G06T 2207/30012
USPC ................................. 382/128, 154, 285, 294
See application file for complete search history.

(56) References Cited

U.S. PATENT DOCUMENTS 6,418,183 B1 *    7/2002  Fox et al. ......................... 378/15
2005/0004451 A1 * 1/2005  Vilsmeier et al. ............. 600/426

(Continued)

OTHER PUBLICATIONS

Cyr C M et al; "2D-3D Registration Based on Shape Matching" Proceedings IEEE Workshop on Mathematical Methods in Biomedical Image Analysis. MMBIA-2000 (CAT. No. PR00737) IEEE Comput. Soc Los Alamitos, CA, USA, 2000, pp. 198-203; XP002451202.

(Continued)

*Primary Examiner* — John Strege
(74) *Attorney, Agent, or Firm* — Tucker Ellis LLP (57) ABSTRACT

The invention concerns a system and method for generating a 3D imaging data set of an object or of at least two elements, including: obtaining a 3D image data set of the object or the at least two elements in a first shape, first absolute position, or first relative position, moving at least one of the elements and/or deforming the object to have a second shape, second absolute position, or second relative position, different from the first shape, first absolute position, or first relative position; obtaining a 2D data set of the object or the at least two elements while in the second shape, second absolute position, or second relative position; and calculating a 3D image data set of the object or the at least two elements in the second shape, absolute, or relative position using said 2D image data set and said 3D image data set. The method also may be performed by obtaining the 2D image data set in the first position and obtaining the 3D image data set in the second position.

11 Claims, 7 Drawing Sheets

(56) References Cited

U.S. PATENT DOCUMENTS

2006/0188139 A1     8/2006  Khamene et al.
2007/0127845 A1*    6/2007  Fu et al. .................... 382/294
2008/0147086 A1*    6/2008  Pfister et al. ................ 606/130

OTHER PUBLICATIONS

Sarojak M. et al.; "An Interactive System for Kinematic Analysis of Artificial Joint Implants" Biomedical Sciences Instrumentation, Instrument Society of America, Pittsburgh, US; vol. 35, 1999, pp. 9-14; XP009007373.

Hamadeh A. et al.; "Kinematic Study of Lumbar Spine Using Functional Radiographies and 3D/2D Registration" Computer Vision; Virtual Reality and Robotics in Medicine. International Conference, CVRMD, Proceedings, Mar. 19, 1997, pp. 109-118; XP008045466.

Byoung-Moon You et al.; "In Vivo Measurement of 3-D Skeletal Kinematics from Sequences of Biplane Radiographs: Application to Knee Kinematics" IEEE Transactions of Medical Imaging, IEEE Service Center, Piscataway, NJ, USA; vol. 20, No. 6; Jun. 2001; XP011036103.

\* cited by examiner

IMAGING METHOD FOR MOTION ANALYSIS

RELATED APPLICATION DATA

This application claims priority of U.S. Provisional Application No. 60/952,885 filed on Jul. 31, 2007, and EP 07112645.2 filed on Jul. 17, 2007, which are incorporated herein by reference in their entirety.

FIELD OF THE INVENTION

The invention relates to a method and apparatus for determining a three-dimensional data set of vertebrae in a second position from a three-dimensional scan of the vertebrae in a first position and a two-dimensional scan of the vertebrae in the second position.

BACKGROUND OF THE INVENTION

Spinal surgery can be used to treat lower back pain. Treatment planning for spinal surgery, however, requires a clear understanding of the causes of lower back pain. Research has shown that there is a link between abnormal patterns of spinal motion and chronic lower back pain.

Previous attempts at quantifying spinal kinematics in vivo have either required a surgical intervention to place rigid tracking pins percutaneously into each vertebra, or have been limited to sagittal plane radiographs evaluated at discrete points in the flexion-extension cycle. For the development of a practical diagnostic tool, accurate three-dimensional kinematic measurements are required.

Methods based on two-dimensional imaging with conventional radiographic techniques do not provide adequate information about the motion patterns of the spine to identify appropriate candidates for treatment or to conduct meaningful follow-up evaluation. Furthermore, techniques that provide discrete snapshots of spinal motion may not capture the specific motion event responsible for pain.

U.S. Pat. No. 6,418,183 B1 relates to two-pass CT imaging, wherein a volume of a patient may be scanned with a first, full field-of-view scan to acquire first projection data. A smaller volume of the patient can be scanned with a second, restricted field-of-view scan to acquire second projection data. An estimate may be made of an amount of shift between the first projection data and the second projection data resulting from patient movement. The first projection data may be blended with the second projection data in accordance with the estimated amount of shift to estimate projections of the second scan.

U.S. Pat. No. 6,556,008 B2 and corresponding DE 100 29 585 A1 relate to a method for the operation of a magnetic resonance apparatus, wherein in a first examination of a subject, a first scout dataset of the subject may be produced and with reference to which at least one first slice of a subject to be imaged may be determined. A second scout dataset of the subject may be produced in at least one further examination of the subject temporally following the first examination. A change in position between the first and the second scout dataset may be identified, and at least one further slice of the subject to be imaged may be defined according to the identified positional change. The further slice may exhibit a similar positioning within the subject with respect to the first slice.

One of the outgrowths of modern computed tomographic (CT or CAT) scanning instrumentation is a method for performing digital radiography that has many of the features of an ordinary radiographic study but in which each data point ("voxel" or small rectangular portion of the painting) is recorded in a discrete, finite manner. This technique is often called the "scout view." The method may consist of placing the x-ray tube and detector assembly in such a position that the painting may be moved linearly through the x-ray beam. As the painting is moved, data from the collector array is collected by the computer and the image of the painting is thus stored in computer memory for subsequent manipulation and display. The collected image, with or without digital processing, may be displayed on a video monitor. In this image, the intensity of each individual point ("pixel") in the image may be proportional to the quantity of x-rays passing through the corresponding point in the painting.

SUMMARY OF THE INVENTION

The present invention relates to a method for determining the motion, relative position, or deformation of an object (for example, an organ) or of at least two elements (for example, vertebrae) to obtain data that can be used for motion or kinematic analysis for treatment planning. In a first step, three-dimensional ("3D") data may be obtained in a first position of an object or of at least two elements (for example, two vertebrae) that can be moved with respect to each other. In general, kinematic analysis of spinal motions requires at least one 3D scan for each movement position to enable the visualization of motion patterns in three dimensions. 3D motion data of a patient is typically acquired using functional MR or fast CT-data acquisition. In accordance with the invention it is sufficient to provide a single set of three dimensional (imaging) data. The 3D data in this first position can be obtained using any appropriate imaging modality (for example, computer tomography (CT)-scan, magnetic resonance imaging (MRI), or ultrasound). In a subsequent step, the object (e.g., the spine) may be deformed and/or the at least two elements (e.g., the vertebrae) may be moved with respect to each other, for example, by changing the position of the patient to a second position after obtaining the 3D data. The object and/or elements then may be imaged or scanned while being in the altered or changed position to obtain two-dimensional ("2D") imaging data of the object or elements in the second position. Using the 2D data of the object or elements (in the second position) and the previously obtained information from the 3D data of the object or elements (in the first position) the 3D position or form of the object and/or elements in the second position can be calculated or reconstructed to determine the deformation of the object and/or the relative movement or motion of the at least two elements when comparing the reconstructed or calculated 3D data with the previously acquired 3D data of the second position of the object and/or elements in the first position.

Since the shape or positions of the object or elements in the second position can be reconstructed in three dimensions using the 2D imaging data (e.g., from a scout-view of a CT scanner) and the original 3D data, the amount of radiation and the time needed to obtain such data can be reduced compared to performing a motion analysis by comparing two full 3D imaging data sets.

Thus, an example using the method allows reconstruction of different or changed positions of an object or element (such as the spine or other anatomical objects, such as bones, organs or tumors) while using only a single (full) 3D (CT) scan. Accordingly, the patient is exposed to a minimal amount of radiation. The second set of 3D data can be reconstructed using the first set of 3D data that may be segmented using known methods. The segmentation may be used to define the boundaries of elements or objects within the data set and/or from two dimensional data, such as one or more projection images or scout-images after movement of the object or elements. The 2D imaging modality also can be dynamic fluoroscopy.

The 3D data may be segmented into segmented objects of interest such as bones, organs or tumors. The segmented objects can be registered to the 2D image or scan to determine the 3D position or shape to reconstruct a second 3D data set. The segmentation of the data set can be performed manually or automatically. The positions of anatomical landmarks (such as the pedicle entry point, the planning of the position and/or shape of screws, discs, or rods) can be compared. Such a comparison can provide information to the physician to advise patients for or against specific surgical treatments, such as artificial disc or fusion surgery.

In accordance with another aspect of the invention, the 2D data may be obtained before altering or moving the object or elements (in the first position) wherein the 3D data is obtained thereafter (in the second position). As described above, the 3D data (to define the shape and/or absolute or relative position(s) of the object or elements in the first position before moving or altering the object or elements) can be reconstructed using the segmented 3D imaging data obtained in the second position. The comparison of the acquired 3D imaging data with the reconstructed 3D imaging data then can be performed as set forth above.

It is noted that 3D imaging data can be acquired using the same imaging apparatus that provides the 2D imaging data (e.g., a CT-scanner that can provide 3D data and one or more 2D scout views). It is also possible, however, that existing 3D or 2D imaging data may be used, since many patients having a history of chronic back pain already have completed at least one imaging session. Use of this existing data further reduces the time and costs and can reduce radiation exposure.

In accordance with the invention, it is no longer necessary to generate a second 3D data set once a 3D data set is available. A second 3D data set can be reconstructed using the available (and segmented) 3D data set and an additional 2D data set and used to compare with the available 3D data set. The additional 2D data set can be acquired using projection images or scout-view images.

In accordance with the invention, information may be provided about the deformation or movement of objects or elements using a single CT-scan in combination with at least one additional 2D or scout-view image or scan (for each sample of patient movement). Additional 3D data can be reconstructed corresponding to the patient movement.

The method in accordance with the invention can provide a non-invasive procedure that allows the measurement of 3D dynamic motion, deformation, or pathological patterns of an object, such as the human spine.

The method in accordance with the invention can provide data for patient diagnosis, screening, follow-up analysis, and examination. The method also can provide the basis for spine surgery planning software in the areas of, for example, disc prosthesis, dynamic stabilization, facet joint reconstruction, etc. while reducing the time and radiation needed to acquire the respective data.

The data provided by the described methods can be used for preoperative and/or intraoperative planning to find the most suitable:
length of a rod to be inserted between two vertebrae, especially when flexible rods are used.
height and/or size of an artificial disc.
center of rotation for artificial disc placement, especially if more than one level surgery is performed.
Interspinous Process Distraction System.

Moreover, the data can be used for:
decision making for or against a certain surgery (for example, after a trauma to a vertebra, a non fused vertebra can be detected).
determine the morphology of the spine (for example, to find out the flexibility of the spine for patients having ankylosing spondylitis (Bechterew's disease)).
checking the range of motion, movement, and status of facet joints.

The method in accordance with the invention can be used to determine how many levels of the spine can be safely navigated during surgery. In some cases, a single vertebra is registered and it is assumed that the neighboring vertebrae do not show any relative movement. This assumption can lead to inaccuracies. Using the method in accordance with the invention, the flexibility of the patient's spine can be determined beforehand and can be used to determine whether or not additional patient registration is necessary. For example, if use of the method determines that the relative movement between L4 and L5 is less than 1 degree and 1 mm but between L4 and L3 is more that 4 degrees and 3 mm, that determination could mean that navigation on L4 and L5 can be done safely by registering only one of those two vertebrae, but for L4 and L3, both vertebrae should be registered.

An exemplary workflow in accordance with the invention to determine which vertebral levels are safe for a procedure can be as follows:
1) Acquire a Scout-View Image (at extension).
2) Perform a 3D Scan (at flexion).
3) Reconstruct 3D data corresponding to the image taken at step (1).
4) Determine flexibility between vertebrae to show which levels are safe for a procedure.

The results of treatment can be checked inter-operatively. In this example, a correction of a spine for scoliosis is planned. During the operation and before fusing the vertebrae, the actual vertebral positions in the patient can be compared to the planning data by acquiring a scout view of the patient. From the scout view, the 3D positions of the individual vertebrae can be reconstructed and these positions can be compared to the planned positions.

In accordance with another exemplary aspect of the invention, a flexible or deformable device can be used to change or alter the position of the patient or object. The deformable device may be an inflatable cushion that is placed below the patient, or any other device that can change the position or shape of the spine from extension to flexion or vice versa.

The invention also relates to a computer program that when loaded or running on a computer, performs or supports the method or steps as set forth above. Furthermore, the invention relates to a program storage medium or a computer program product comprising such a program.

In accordance with another aspect of the invention, a system is provided for determining the motion, relative position, or deformation of an object or of at least two elements that can be used to generate data in motion analysis including: an apparatus for generating 3D data of an object or elements, such as a CT-scanner, a MR-scanner, or data reading device to read previously recorded 3D imaging data of an object or elements; and an apparatus for generating at least one 2D image of the object or elements, such as a CT-scanner or MR-scanner having the ability to generate scout-views, a C-arm or a reading device to read data of at least one previously recorded 2D image. The apparatus for providing the 3D data and the apparatus for providing the 2D data may be connected to a computer or processor capable to perform the above described method.

BRIEF DESCRIPTION OF THE DRAWINGS

The forgoing and other features of the invention are hereinafter discussed with reference to the figures.

DETAILED DESCRIPTION

Figure 1:
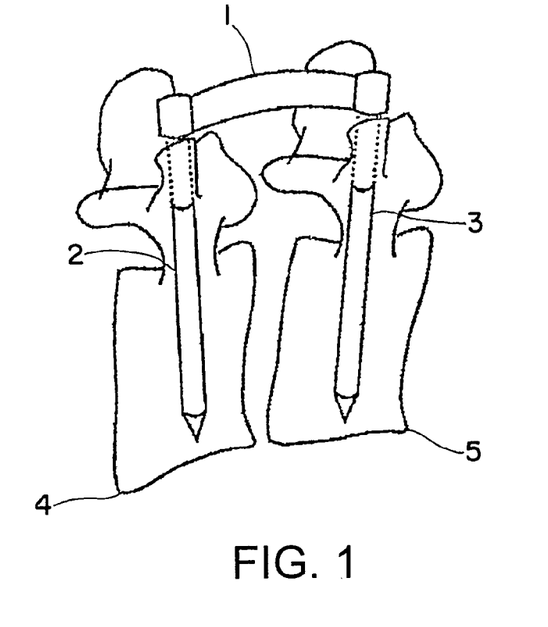
FIG. 1 shows two vertebrae with inserted screws in an exemplary first position.

An exemplary application of a method in accordance with the invention may be the pre-operative planning of an operation to implant flexible rods 1 (FIG. 1). The problem the surgeon faces is pre-operative selection of the length and flexibility of the rods 1. In accordance with the invention, a selection can be made using a single CT scan and one scout view of the patient, each of the scan and view showing a different flexion of the spine.

FIG. 1 shows a 3D CT-scan depicting screws 2 and 3 inserted into vertebrae 4 and 5 representing an extension showing the minimum length that screws 2 and 3 should measure to hold rods 1 in place. The length of the rods 1 for this first position (extension) may be calculated.

Figure 2:
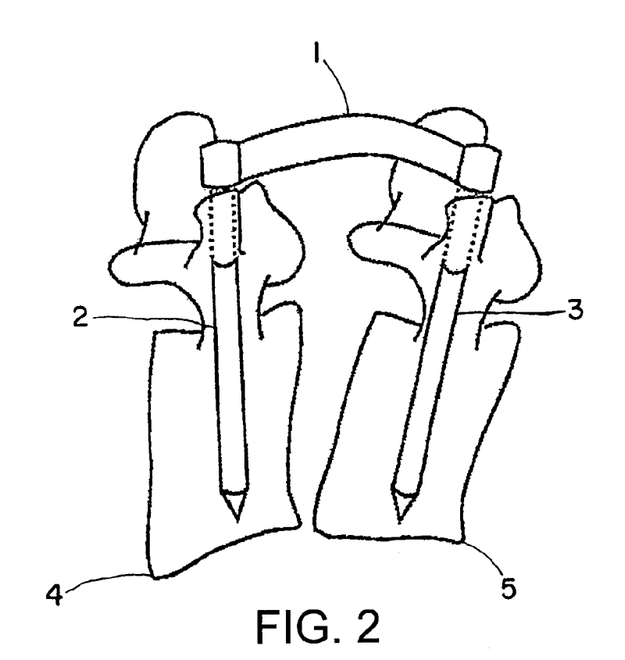
FIG. 2 shows two vertebrae with inserted screws in an exemplary second position after movement of the patient.

FIG. 2 shows a reconstructed 3D image calculated from the CT-scan and one out of multiple scout views representing a state where the patient is in a flexion position thus showing the maximum length of the rod 1. The projection parameters of the scout view may be determined beforehand. There may not be a need for a camera or navigation system, since only the projection parameters of the scout view are of interest and it is not necessary to consider the position of the scanner.

The planned screws 2 and 3 of the first position shown in FIG. 1 may be copied into the reconstructed 3D image of FIG. 2 that shows the same patient in a different position and the length of the rods 1 again may be determined.

Figure 3:
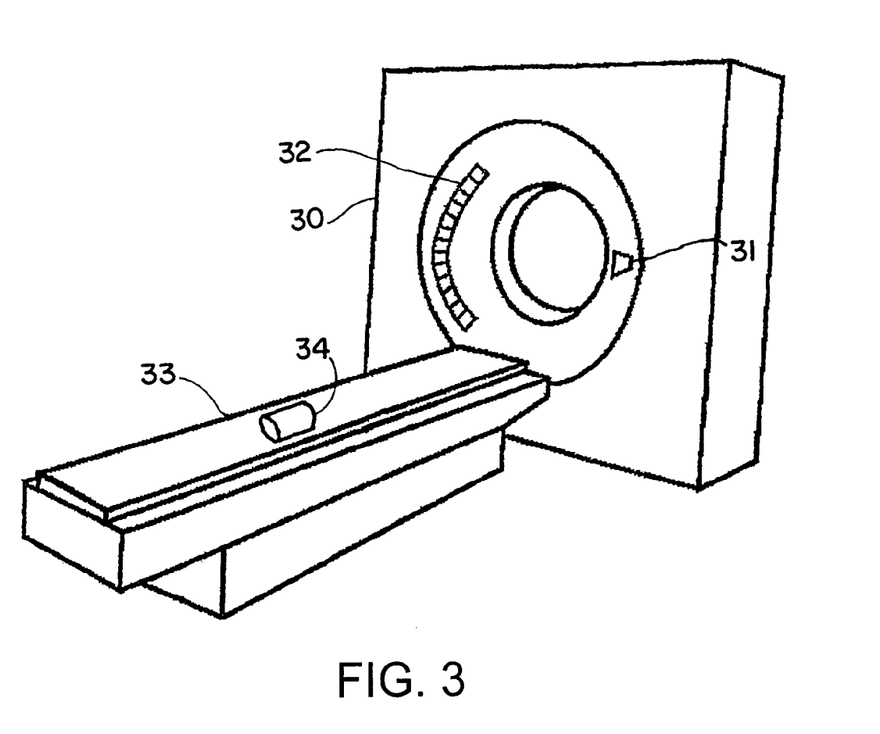
FIG. 3 shows an exemplary CT-scanner.

FIG. 3 illustrates an exemplary intra-operative imaging device 30, such as a CT scanner 30, where 31 is a radiation source and 32 is a row of detector elements. The scanner 30 can be replaced by any other imaging source (for example, 3D C-arm or an MR device). A table 33 is provided for the patient.

To determine different flexion positions of the spine, an inflatable cushion 34 can be placed underneath the patient lying on the table 33. A first scout view and a 3D scan can be done with the cushion 34 inflated. This scout view can provide an overview with the spine in full flexion. The air of the cushion 34 then can then be fully or partially removed (if several positions should be considered) and another scout view is acquired.

The scan for the initial position is to be transformed into the new position. To perform this transformation, the objects of interest (vertebrae 4 and 5 in the example) in the 3D dataset are segmented. Each object 4 and 5 may be matched to the second scout view image(s) to determine the a position and rotation in 3D space.

In case of a CT scanner, the scout view may be a projection image. If fluoroscopic images are used, the geometry of the image source may be different. Fluoroscopic images have one focus point, whereas the scout view in a CT scan has a focus line.

The projection parameters may be determined to correctly project the segmented vertebra into the image. A calibration phantom may be provided that is scanned at least once using the scout view and, optionally, a 3D scan is taken to check if the projection parameters have been calculated correctly.

Figure 4:
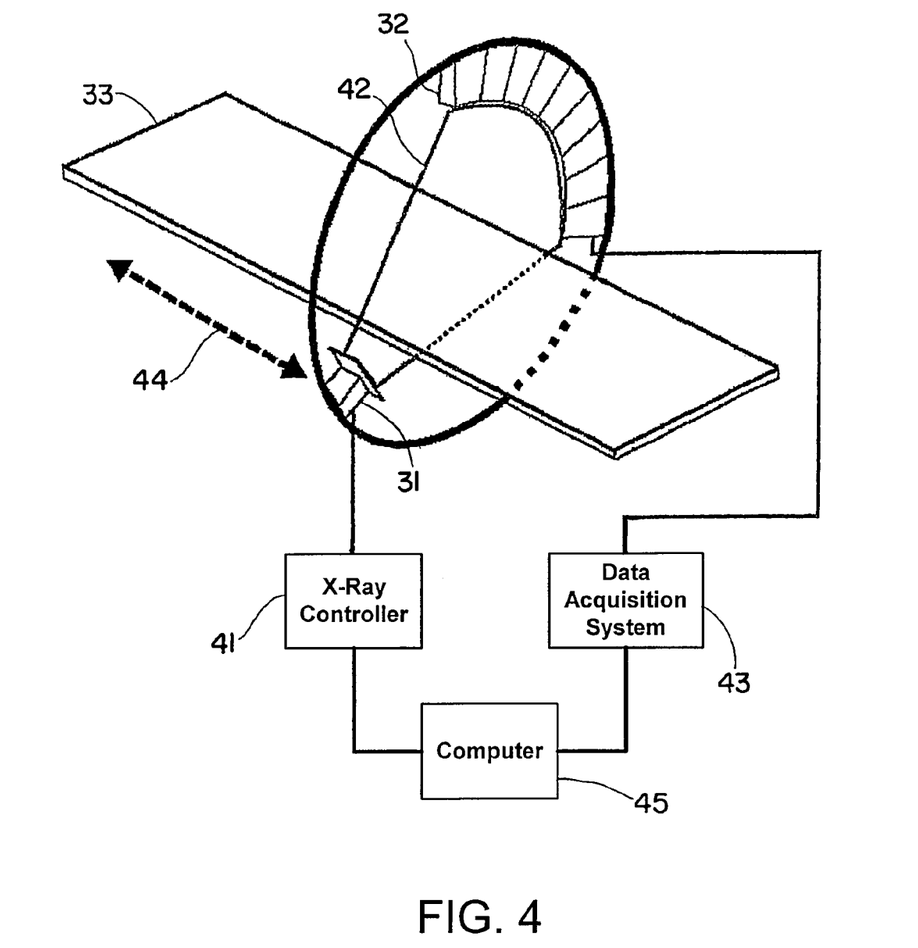
FIG. 4 shows a block diagram of the CT-scanner shown in FIG. 3

An arrangement for creating a scout view is shown in FIG. 4. The radiation source 31 being controlled by an x-ray controller 41 emits a beam of radiation 42 that is captured by the detector elements 32 that are in turn connected to a data acquisition system 43. To acquire a scout view, the radiation source 31 may be moved along the patient table 33 on an exemplary path shown as 44. The result of the scout view is an overview of the patient, wherein the patient is exposed to a lower level of radiation than required for a full scan. The controller 41 and a data acquisition system 43 are connected to a computer 45 for storing the acquired 2D and 3D images.

After the projection parameters are known, the vertebrae of the 2D image can be registered with the 3D data scan.

To reconstruct the 3D position of the segmented object(s), a database consisting of outlines for a set of expected rotations may be created. For example, if the possible range of motion for a vertebra is within +/−5 degrees, then a database may be created that contains exemplary contours for every 0.5 degree of rotation of a vertebra for all three axes.

The segmented vertebra is pre-positioned on the scout view using the initial position of the patient in the 3D scan. This positioning provides a fairly close starting position for the search. The outline of the vertebra in the scout view may be determined and a search may be initiated of the contour database for the 3D position and orientation producing the most similar contour.

The resulting transformation matrix allows reconstruction of a new 3D data set for the patient for all objects upon which the matching process was performed. This matrix allows a physician to transform all the data associated with the vertebrae (e.g., planned screws, landmarks, or other information) to the new scan and to determine the differences from the original 3D scan without having to perform a second scan. In an alternative workflow, the acquisition of the scout view images can be moved to the beginning of the process and the reconstruction may be done when the 3D data is available.

Figure 5:
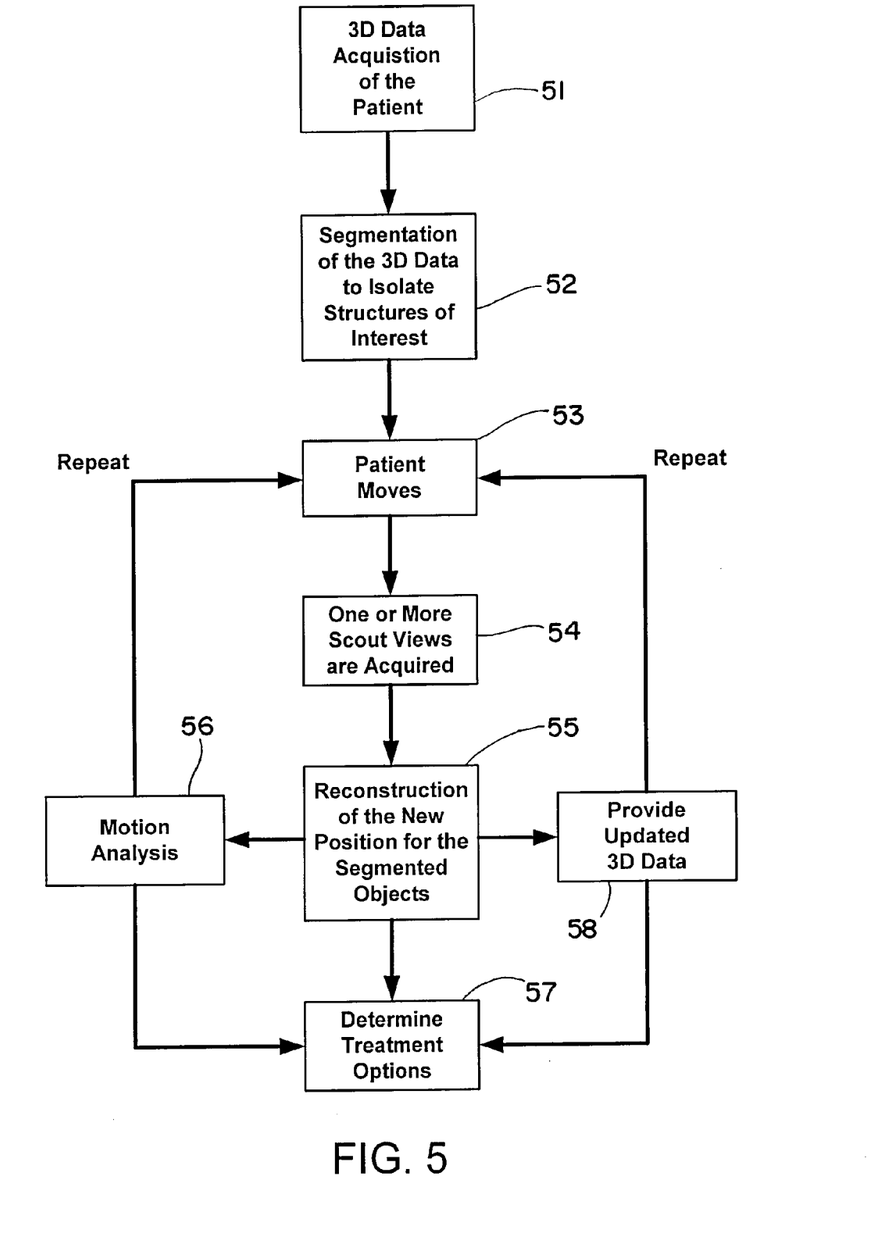
FIG. 5 shows an exemplary flow diagram illustrating one aspect of a method in accordance with the invention.

FIG. 5 shows a flow diagram illustrating an exemplary method in accordance with the invention. In a first step 51, a single 3D scan of an object, such as the spine of a patient, can be obtained (for example, by conventional CT or with ISO-C fluoroscopy). This 3D scan of the object can be used to generate a "pose library" containing virtual templates of vertebral outlines of the scanned objects, such as the vertebrae.

A first step in data processing may be segmentation (automatic, semi-automatic, or manual) of the 3D CT or ISO-C dataset in step 52. This segmentation also can be performed after acquiring scout views. Vertebral bodies and other anatomical structures of interest can include bifurcations and regions of overlap between two adjacent bodies so that a simple thresholding method can be used.

Following the segmentation of each vertebral body, a library of "virtual projections" may be created for each body (not shown). Starting from a reference position and orientation, the 2D projection of the 3D body may be calculated for every possible rotation about the three axes of motion. To reduce the quantity of data required for storing this library of projections, and to facilitate subsequent kinematic analyses, each profile can be converted from a Cartesian representation into a shape description in a polar coordinate representation.

In a subsequent kinematic examination, the position of the patient can be changed several times, as represented by step 53. For example, patients can be instructed to complete a pre-defined series of motions within the imaging volume of a conventional C-arm that can capture the motion sequence at step 54 (for example, at rates of at least ten frames/second). It is also possible to enhance the examination protocol, for example, by requesting that the patient press a button when the patient experiences pain to thereby allowing synchronization of the pain symptoms with specific frames in the video fluoroscopy sequence.

Individual vertebrae from each frame of the video fluoroscopic data may be segmented. Image data from the C-arm may be calibrated and corrected for image distortion. Also, it is possible to isolate individual vertebral contours in noisy fluoroscope images using a Hough transform. Use of a method of "fuzzy templates and masks," may be employed, whereby the search area for the vertebral boundary is limited to a logical region defined by the previous frame from the analysis. This method can be used as a method for isolating individual markers and boundaries on RSA images (Röntgen stereophotogrammetric analysis) of varying quality. An advantage of this method is the potential for an order of magnitude improvement in computation time. Individual vertebral boundaries derived from the video fluoroscopy images can be converted to a polar coordinate shape description.

A search and match algorithm may be employed to find the individual 3D shape description in the library that best matches the shape description from the video fluoroscopy frame to reconstruct in step 55 the positions and objects visible in the scout views. Again, based on a priori knowledge of the previous frame's results and the limitations for possible motion extents in subsequent frames, the search boundaries can be substantially limited to improve speed. Matching of profiles may be evaluated using a cross-correlation.

Based on the derived knowledge of the position and rotation of each vertebra with reference to a global starting point, the relative motion of two adjacent vertebral bodies can be calculated in terms of the standard convention of three Euler rotations and three translations. This relative motion can be used for motion analysis 56, to determine treatment options 57, or to provide updated 3D data in step 58, likely before the patient is moved further if desired at step 53 and the method is repeated.

Figure 6:
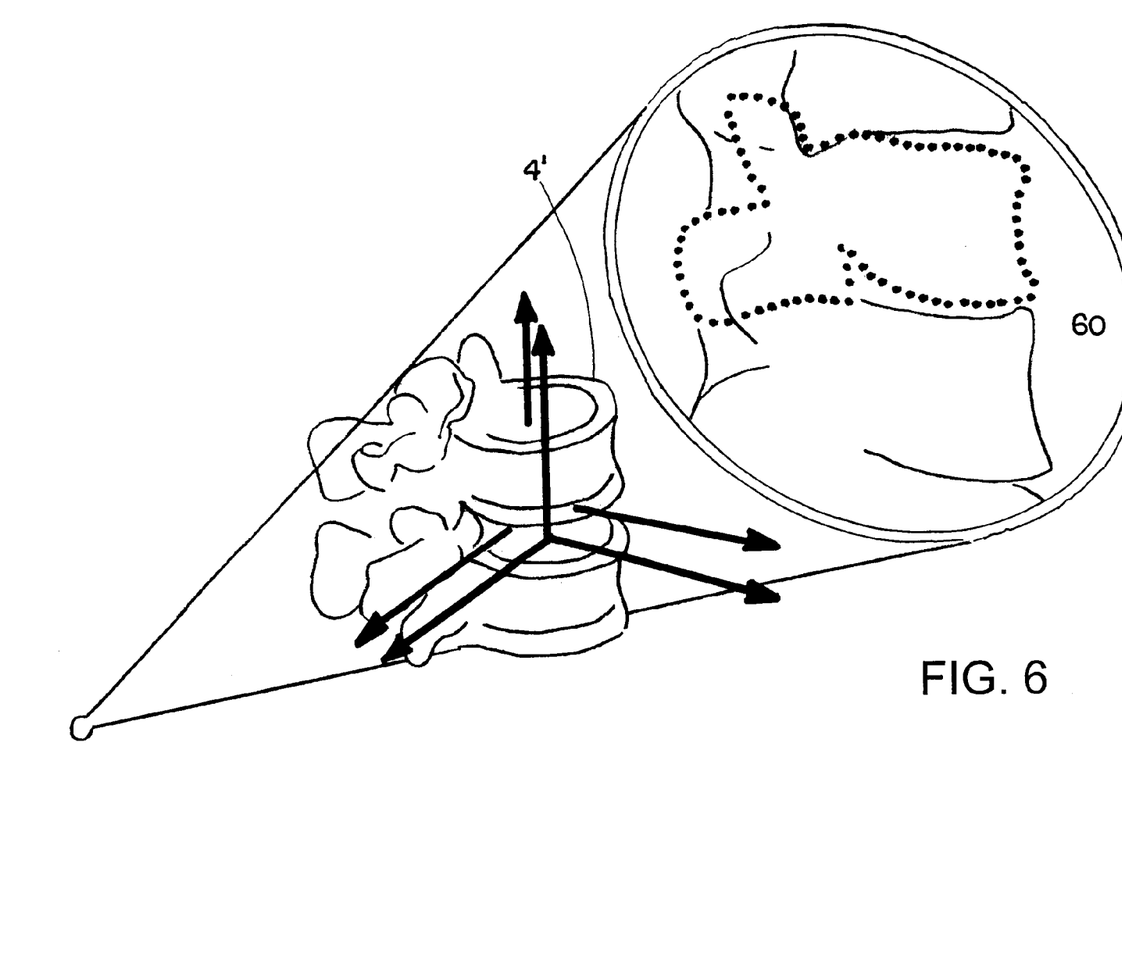
FIG. 6 shows the exemplary extraction of 2D vertebral outlines from dynamic video fluoroscopy sequences in accordance with the invention.

Pattern matching can be performed comparing 2D vertebral outlines of individual vertebra 4' (obtained from single video fluoroscopy frames 60, as shown in FIG. 6) to virtual templates of vertebral outlines.

Figure 7:
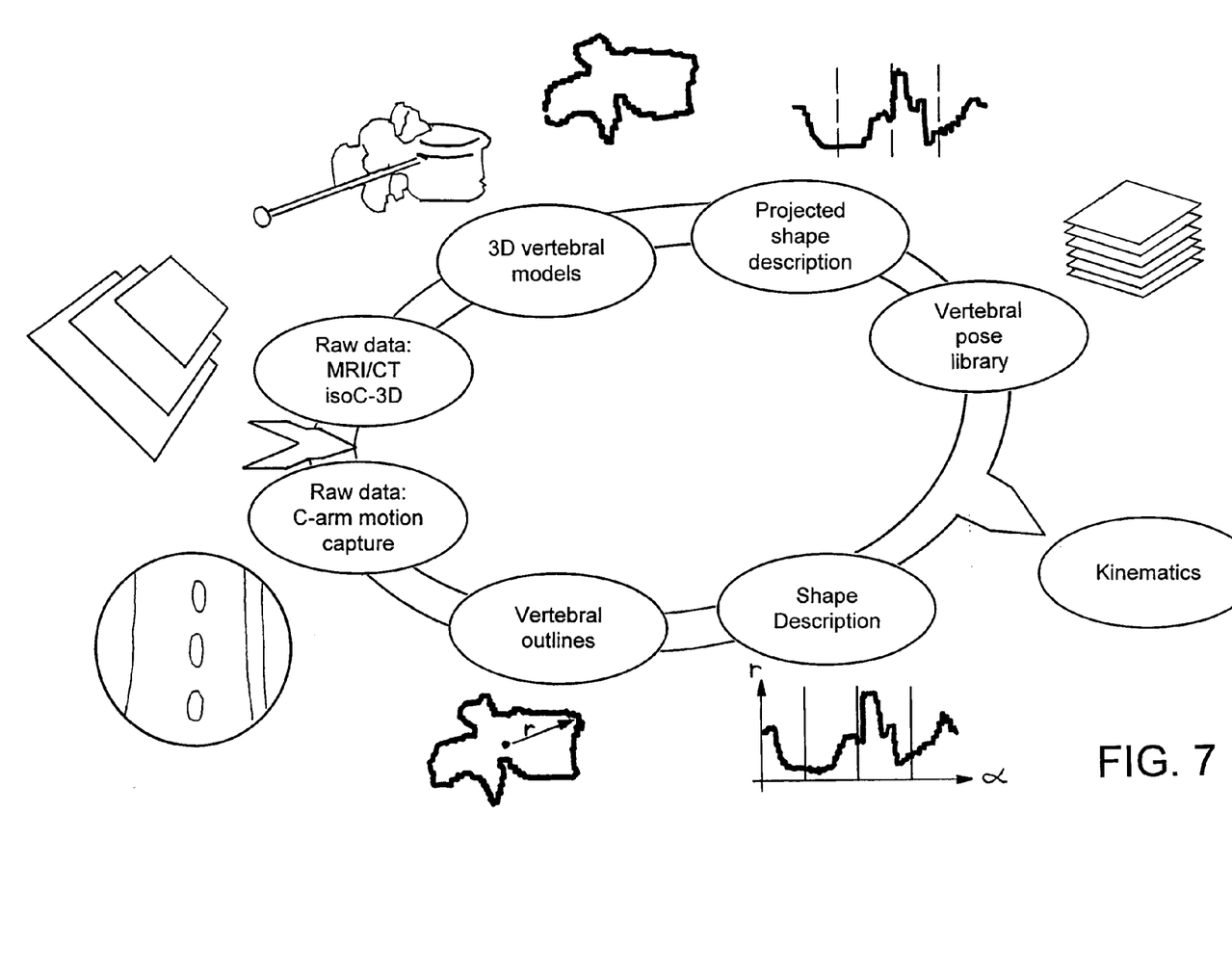
FIG. 7 shows an exemplary measurement protocol.

An exemplary measurement protocol is illustrated schematically in FIG. 7. While the focus of the exemplary method above is the determination of spine kinematics in vivo, it is also possible to use the method for in vivo kinematic measurements of natural diarthrodial joints and prosthesis components, and monitoring of 3D fracture fragment motion. In parallel to the technical development of the image analysis and kinematic algorithms, statistical methods based on Principal Component Analysis can be used for the comparison of multi-parameter motion waveforms to allow categorization of patient kinematic data into normal and pathological groups.

Figure 8:
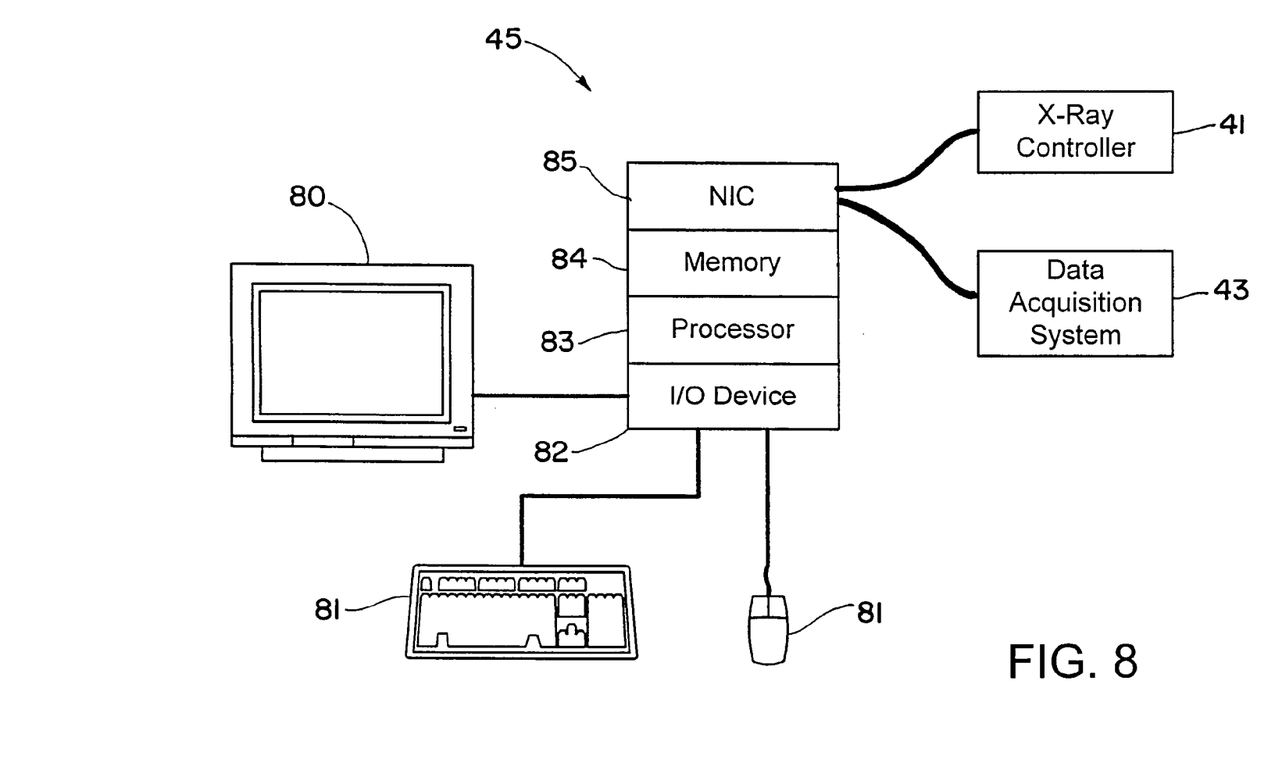
FIG. 8 shows a block diagram of an exemplary computer that may be used with any of the methods described herein.

Turning now to FIG. 8 there is shown a block diagram of an exemplary computer 45 that may be used to implement one or more of the methods described herein. The computer 45 may be a standalone computer, or it may be connected to an x-ray controller 41 or a data acquisition system 43, for example.

The computer 45 may be connected to a display or monitor 80 for viewing system information, and an input device 81 for data entry, screen navigation, etc. Examples of a input device 81 include a keyboard, computer mouse or other device that points to or otherwise identifies a location, action, etc., e.g., by a point and click method or some other method. Alternatively, a touch screen (not shown) may be used in place of the input device 81. The monitor 80 and input device 81 communicate with a processor via an input/output device 82, such as a video card and/or serial port (e.g., a USB port or the like).

A processor 83, such as an AMD Athlon 64® processor or an Intel Pentium IV® processor, combined with a memory 84 execute programs to perform various functions, such as data entry, numerical calculations, screen display, system setup, etc. The memory 84 may comprise several devices, including volatile and non-volatile memory components. Accordingly, the memory 84 may include, for example, random access memory (RAM), read-only memory (ROM), hard disks, floppy disks, optical disks (e.g., CDs and DVDs), tapes, flash devices and/or other memory components, plus associated drives, players and/or readers for the memory devices. The processor 83 and the memory 84 are coupled using a local interface (not shown). The local interface may be, for example, a data bus with accompanying control bus, a network, or other subsystem.

The memory may form part of a storage medium for storing information, such as application data, screen information, programs, etc., part of which may be in the form of a database. The storage medium may be a hard drive, for example, or any other storage means that can retain data, including other magnetic and/or optical storage devices. A network interface card (NIC) 85 allows the computer 45 to communicate with other devices. Such other devices may include an x-ray controller 41 or a data acquisition system 43.

A person having ordinary skill in the art of computer programming and applications of programming for computer systems would be able in view of the description provided herein to program a computer system 45 to operate and to carry out the functions described herein. Accordingly, details as to the specific programming code have been omitted for the sake of brevity. Also, while software in the memory 84 or in some other memory of the computer and/or server may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, that can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed Figures. For example, regard to the various functions performed by the above described elements (components, assemblies, devices, software, computer programs, etc.), the terms (including a reference to a "means") used to describe such elements are intended to correspond, unless otherwise indicated, to any element that performs the specified function of the described element (i.e., that is functionally equivalent), even though not structurally equivalent to the disclosed structure that performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for determining motion, relative position or deformation of an object or of at least two elements of an associated patient in order to synchronize a physiological condition perceived by the associated patient with a 2D data set, the method comprising:
    obtaining a 3D image data set of the object or the at least two elements when the associated patient is in a first shape, first absolute position, or first relative position;
    moving at least one of the elements and/or deforming the object of the associated patient to a second shape, second absolute position, or second relative position, different from the first shape, first absolute position, or first relative position;
    selectively obtaining the 2D data set of the object or the at least two elements while in the second shape, second absolute position, or second relative position, wherein the 2D data set corresponds to the physiological condition perceived by the associated patient;
    calculating a 3D image data set of the object or the at least two elements in the second shape, absolute, or relative position using said 2D image data set and said 3D image data set: and
    determining the motion, relative position or deformation of the object based on a comparison of the calculated 3D image data set with the obtained 3D image data set.

2. The method according to claim 1, further comprising segmenting the 3D image data set to determine the shapes and/or boundaries of the at least two elements.

3. The method according to claim 1, wherein the 3D image data set is obtained from a CT-scan, MR-scan, 3D fluoroscopy, or 3D Ultrasound.

4. The method according to claim 1, wherein the 2D image data set is obtained from a scout view obtained using a CT-scanner or MR-scanner, or from fluoroscopy or radiographs.

5. The method according to claim 1, wherein the 2D image data set is obtained using the same imaging modality used to obtain the 3D image data set.

6. The method according to claim 1, further comprising calibrating the 2D image data set to obtain projection parameters.

7. The method according to claim 1, wherein moving at least one of the elements and/or deforming the object to have the second shape, second absolute position, or second relative position is performed using a deforming device.

8. The method according to claim 7, wherein the deforming device comprises an inflatable cushion.

9. A computer program embodied on a non-transitory computer readable medium for determining motion, relative position or deformation of at least two elements of an associated patient in order to synchronize a physiological condition perceived by the associated patient with a 2D data set, comprising:
    code for obtaining a 3D image data set of the object or the at least two elements when the associated patient is in a first shape, first absolute position, or first relative position;
    code for selectively obtaining the 2D data set of the object or the at least two elements while in a second shape, second absolute position, or second relative position, different from the first shape, first absolute position, or first relative position, wherein the 2D data set corresponds to the physiological condition perceived by the associated patient;
    code for calculating a 3D image data set of the object or the at least two elements in the second shape, absolute, or relative position using said 2D image data set and said 3D image data set: and
    code that determines the motion, relative position or deformation of the object based on a comparison of the calculated 3D image data set with the obtained 3D image data set.

10. A system for determining motion, relative position or deformation of an object or of at least two elements of an associated patient in order to synchronize a physiological condition perceived by the associated patient with a 2D data set, comprising:
    an apparatus for generating a 3D image data set of an object or elements or a data reading device to read previously recorded a 3D image data set of an object or elements of the associated patient;
    an apparatus for generating at least one 2D image data set of the object or elements or a reading device to read data of at least one previously recorded 2D image data set of the object or elements;
    a computer operatively coupled to receive said 3D image data set of an object or elements and said 2D image data set of the object or elements, said computer comprising:
    a processor and memory, and
    logic stored in the memory and executable by the processor, said logic including:
    logic that obtains a 3D image data set of the object or the at least two elements when the associated patient is in a first shape, first absolute position, or first relative position;
    logic that selectively obtains the 2D data set of the object or the at least two elements while in the second shape, second absolute position, or second relative position, different from the first shape, first absolute position, or first relative position, wherein the 2D data set corresponds to the physiological condition perceived by the associated patient;

logic that calculates a 3D image data set of the object or the at least two elements in the second shape, absolute, or relative position using said 2D image data set and said 3D image data set; and logic that determines the motion, relative position or deformation of the object based on a comparison of the calculated 3D image data set to the obtained 3D image data set.

11. The system according to claim 10, further comprising a deforming device for moving at least one of the elements and/or deforming the object from the first shape, first absolute position, or first relative position to the second shape, second absolute position, or second relative position.

* * * * *